United States Patent Office 3,566,561
Patented Mar. 2, 1971

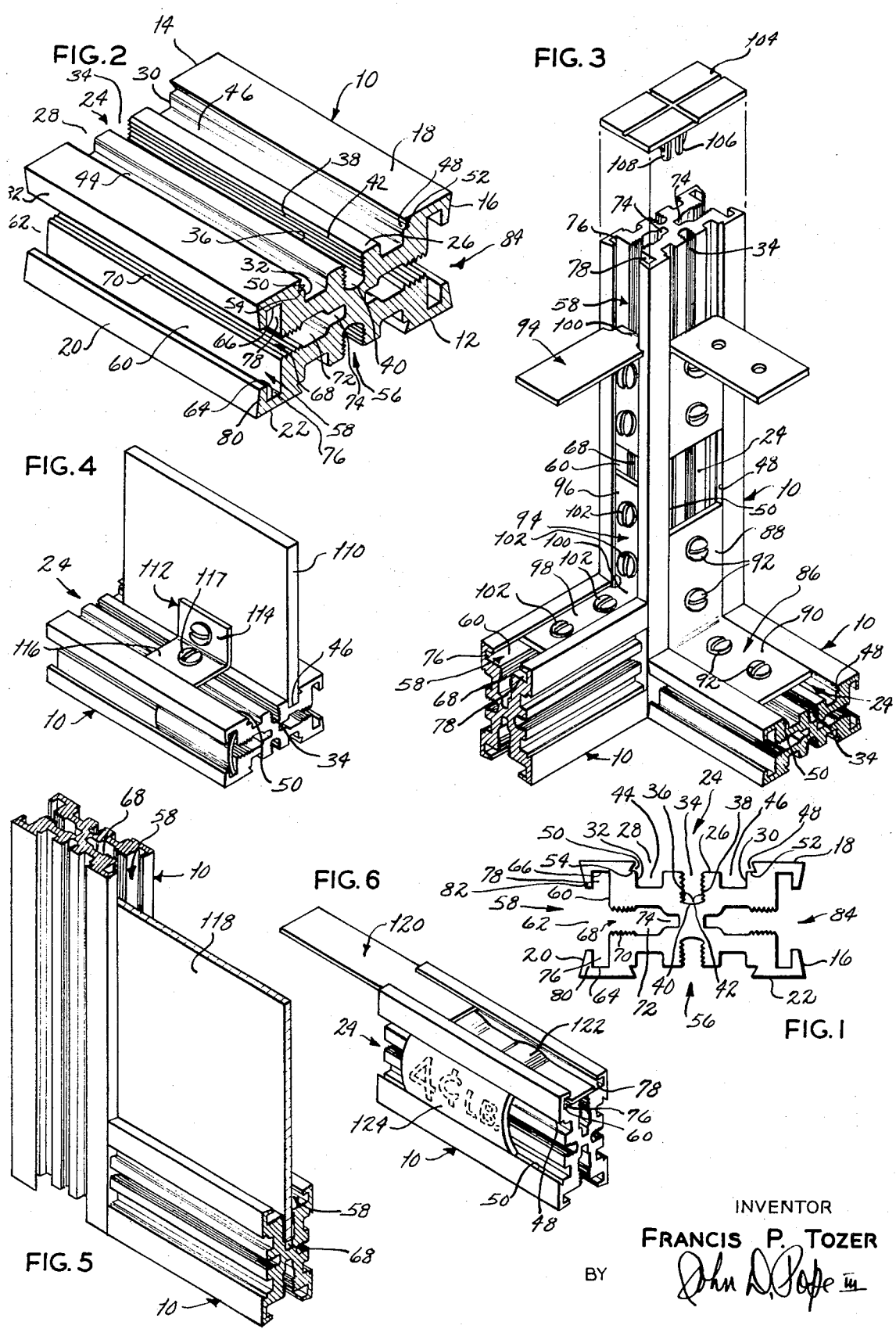

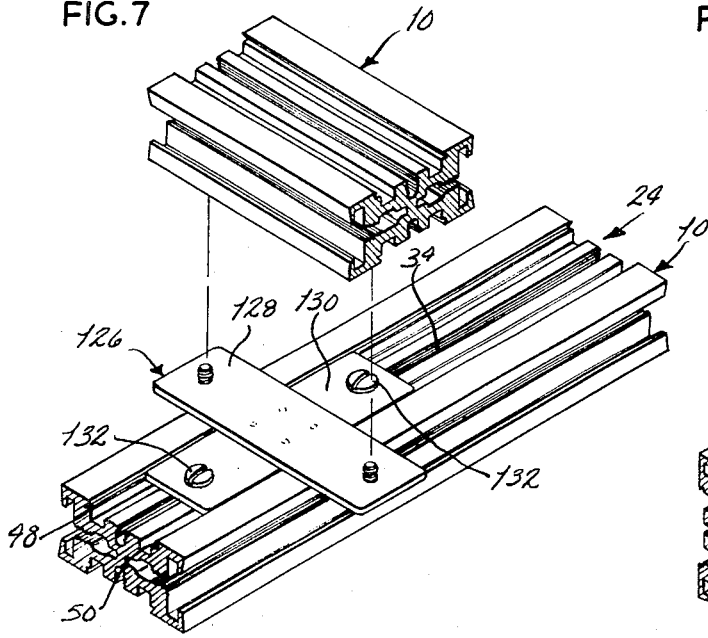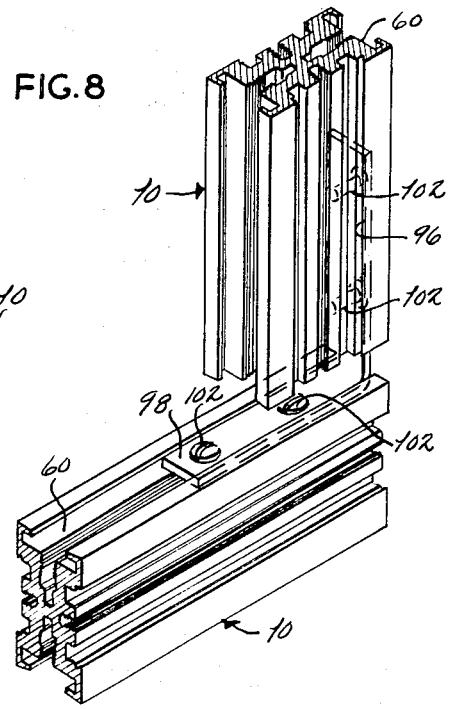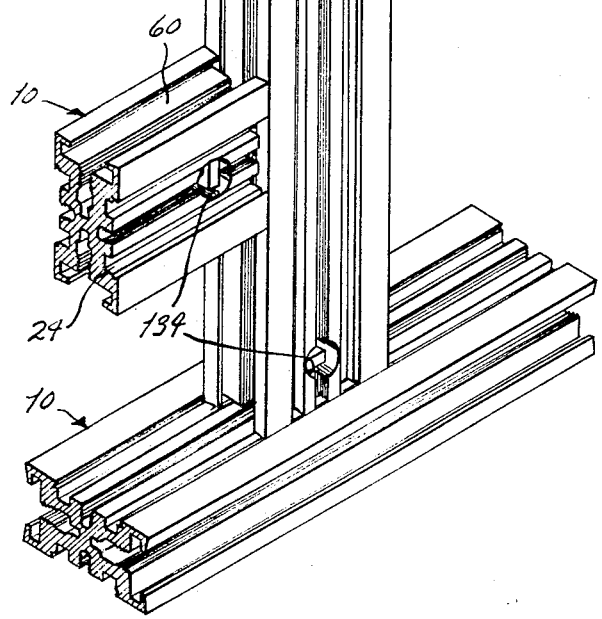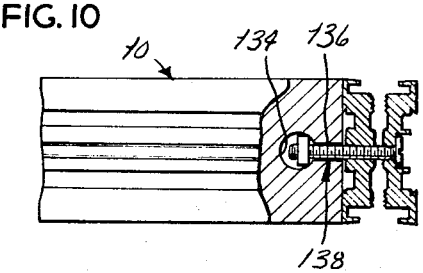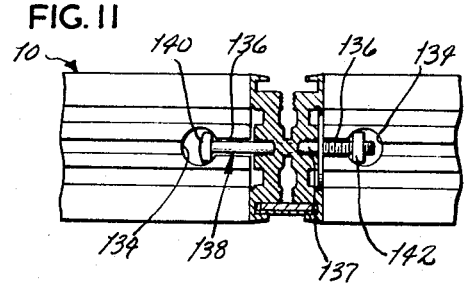

3,566,561
CHANNELLED STRUCTURAL ELEMENTS
Francis P. Tozer, 1601 S. Hanley Road,
St. Louis, Mo. 63144
Filed Oct. 8, 1968, Ser. No. 765,781
Int. Cl. E04c *3/32*
U.S. Cl. 52—127                    10 Claims

ABSTRACT OF THE DISCLOSURE

A structural element is comprised of an elongated body member having a channel extending along one of its sides, the channel having in cross-section an open mouth and a channel floor between two lateral channel walls. A threaded slot extends along the length of the channel floor and is substantially U-shaped in cross-section, having threads running longitudinally along its slot walls. First and second channel-wall grooves are positioned opposite each other in the two lateral channel walls and extend longitudinally along the length thereof. The structural element may include brackets secured in the channel by bolts threadably engaging the threaded slot, sheet members enclosed within frames formed by a plurality of body members, sheet members slidably inserted within the channel-wall grooves and held therein by a spring element between the channel floor and the sheet member, and cross-shaped brackets for securing two body members together by bolt means threadably engaging the threaded slots of the respective body members. A modification of this structural element includes apertures extending through the body elements transverse to the longitudinal axis of the channel and a second aperture extending inwardly from the end of the body member in communication with the first-mentioned aperture.

---

This invention relates to structural elements and more specifically to structural elements which may be assembled in an infinite variety of configurations.

One of the problems encountered in the construction of support structures such as display stands is finding structural elements which may be quickly and easily secured together at any point along their lengths. In order to build configurations from the structural elements known in the present state of the art it is necessary to utilize a great number of cutting, drilling, welding and shaping tools. After the assembled structure has served its purpose, the structural elements must be reshaped and conditioned before they can be utilized in a new configuration. Often they are not adaptable for any further use and must be discarded. This invention embodies means for securing various elements together with a minimum number of simple tools. This is done by providing a body element which includes a plurality of channels and threaded grooves which permit the attachment of other body members and structural elements at any desired point on its outer surface.

Among the several objects of the present invention may be noted the provision of a structural element which may be fastened together with other elements in an infinite variety of ways; the provision of a structural element which will threadably receive bolts at points along its entire length; the provision of a structural element which will slidably receive other elements in a variety of ways and positions to enable flexibility in attaining any desired configuration; the provision of a structural element which may be combined with other similar elements to form a frame which will embrace a sheet member; the provision of a structural element which can be used over and over again in different structural configurations; and the provision of a structural element which is attractive in appearance, economical to manufacture, and durable in use. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is an end view of the body member of the structural element;

FIG. 2 is a perspective view of the body member of the structural element;

FIG. 3 is a pictorial view of the structural element illustrating the securement of brackets in the channels and showing the end cap on the end of the body member;

FIG. 4 is a pictorial view of a sheet member secured to the body member by means of an L-shaped bracket;

FIG. 5 is a pictorial view illustrating the use of the body members as a frame for embracing a sheet member;

FIG. 6 is a pictorial view illustrating the securement of various sheet members and spring elements to the body member;

FIG. 7 illustrates the use of a cross-shaped bracket to secure two body members together;

FIG. 8 illustrates the use of L-shaped brackets to secure two body members together; and FIGS. 9, 10, and 11 illustrate a modification of the structural element.

Corresponding reference characters indicate corresponding parts throughout the several views of the drawings.

Referring to FIGS. 1 and 2, 10 designates an elongated body member having opposite ends 12, 14, and lateral sides 16, 18, 20, 22. Body member 10 is substantially rectangular in cross-section and may be of any desired length. It may be constructed of any hard material such as plastics or metal, but the preferable material is aluminum. Body member 10 may be produced by casting, milling or any other convenient process, but the preferable method for making it is by extruding aluminum through a die. Along side 18 is a channel 24. As viewed from the end of body member 10 channel 24 has a channel floor 26, a channel mouth 28 opposite from channel floor 26, and two lateral channel walls 30, 32, extending between mouth 28 and floor 26. A threaded slot 34 extends along the length of channel floor 26 parallel to the longitudinal axis of channel 24 and body member 10. Threaded slot 34 is substantially U-shaped in cross-section having slot walls 36, 38, and slot floor 40. Slot walls 36, 38, have longitudinal threads 42 extending along their lengths. Threads 42 consist of a plurality of parallel grooves which run along the length of slot walls 36, 38. The result of this arrangement of the grooves is that threads 42 can threadably engage a bolt to prevent its movement upwardly out of thread slot 34 and at the same time allow the bolt to slide longitudinally within threaded slot 34. This longitudinal sliding may be prevented by screwing the bolt downwardly into threaded slot 34 until its end engages threaded slot floor 40. Examples of the uses to which this configuration may be put will be further discussed with reference to the remaining figures.

Also within channel floor 26 are two smooth-walled slots 44, 46, which are positioned on opposite sides of threaded slot 34 and which extend parallel thereto. Smooth-walled slots 44, 46, are substantially U-shaped in cross-section. Channel walls 30, 32, form the outer smooth walls of slots 46, 44, respectively. Channel walls 30, 32, each are equipped with a channel-wall groove 48 and 50, respectively. Channel-wall grooves 48, 50, are substantially V-shaped in cross-section with the open ends of the cross-sectional V-shapes facing one another on opposite sides of channel 24. The V-shaped sides of channel-wall grooves 48, 50, are positioned so that they form horizontal shoulders 52, 54. Shoulders 52, 54, are substantially in the same horizontal plane as the portions of channel floor 26 between threaded slot 34 and smooth-walled slots 44, 46, so that a plate or sheet member resting on shoulders 52, 54, will also rest on the aforementioned portions of channel floor 26. It should also be noted that channel 24 is substantially narrower adjacent its open mouth 28 than at V-shaped channel-wall grooves 48, 50. The purpose of this construction is to allow the sliding reception of a sheet member within channel-wall grooves 48, 50, with wall grooves 48, 50, holding the sheet member against movement upwardly out of channel 24. A channel 56 extends along side 22 opposite side 18 of body member 10. Channel 56 is identical to channel 24 in all respects including the aforementioned threaded slot 34, smooth-walled slots 44, 46, and channel-wall grooves 48, 50.

Extending along side 20 is an additional channel 58. Channel 58 has a floor 60, a mouth 62, and lateral side walls 64, 66. In channel floor 60 is a threaded slot 68. Adjacent the mouth of threaded slot 68 are longitudinal parallel threads 70. Threaded slot 68 includes two smooth-walled portions located inwardly of threaded portions 70. A wide smooth portion 72 is adjacent threads 70 and a reduced smooth portion 74 is adjacent the extreme inward end of threaded slot 68. Threaded slot 68 is thus adapted to receive bolt means and is also adapted to receive the edge of a sheet member which may extend inwardly of threaded slots 68 to be embraced by wide smooth portion 72. The use of threaded slot 68 to receive a sheet member is illustrated in FIG. 5.

Lateral side walls 64, 66, form first and second channel-wall grooves 76, 78, which are substantially U-shaped in cross-section and which have their cross-sectional open ends facing one another. Inwardly projecting flanges 80, 82, are located adjacent channel mouth 62 of channel 58, thereby causing mouth 62 to be substantially narrower in width than the distance between the extreme inner ends of channel-wall grooves 76, 78.

Extending along side 16 of body member 10 is a channel 84 which is identical in construction to channel 58. Thus, body member 10 is substantially rectangular in cross-section having two identical channels 24, 56, on opposite sides thereof and having two additional identical channels 58, 84, on the remaining two sides. Channels 24, 56, will hereinafter be referred to as the first-mentioned channels and channels 62, 84, will hereinafter be referred to as the additional channels. It should be noted that first-mentioned channels 24, 56, extend along the wide rectangular sides of body member 10 while additional channels 62, 84, extend along the narrower rectangular sides of body member 10. Consequently first-mentioned channels 24, 56, are wider than additional channels 62, 84.

In FIG. 3 are illustrated three identical body members 10. An L-shaped bracket member 86 connects two of the body members 10. L-shaped bracket 86 incldues two transverse legs 88, 90, which are slidably received within the V-shaped channel-wall grooves 48, 50, of first-mentioned channels 24 of the two body members 10. Bolts 92 extend through apertures in legs 88, 90, and threadably engage the threads of threaded slots 34 in the floor of first-mentioned channels 24. When bolts 92 are only partially screwed into the threads of threaded slots 34, they hold legs 88, 90, of brackets 86 against movement upwardly out of first-mentioned channels 24, but may permit sliding movement along the length of channels 24. As bolts 92 are tightened they hold legs 88, 90, against any movement within first-mentioned channels 24.

A second type of L-shaped bracket 94 is adapted to be received within channel-wall grooves 76, 78, of additional channel 58 of body members 10. Bracket 94 includes two transverse legs 96, 98, which have a reduced width at their juncture 100. L-shaped bracket 94 is secured within channel-wall grooves 76, 78, by bolts 102 which extend through apertures in bracket 94 and threadably engage threaded slot 68. FIG. 3 illustrates the use of L-shaped bracket 94 to secure two body members 10 together wherein the exterior surfaces of both legs 96, 98, abut against the channel floors 60 of the two body members 10. Another use of bracket 94 is illustrated in FIG. 8 wherein the outer surface of leg 98 abuts against channel floor 60 of one body member 10, and the interior surface of leg 96 abuts against channel floor 60 of the other body member 10.

Also illustrated in FIG. 3 is a cap 104 having two downwardly projecting prongs 106, 108, which are adapted to be received within the reduced portions 74 of threaded slots 68 in additional channels 58, 84, respectively. Prongs 106, 108, thereby embrace the end of body member 10 to detachably hold cap 104 thereon.

Referring to FIG. 4, a sheet member 110 has one of its edges inserted within smooth-walled slot 46 of first-mentioned channel 24. An L-shaped bracket 112 having transverse legs 114, 116, secures sheet member 110 to body member 10. Leg 114 abuts against sheet member 110 and is operatively secured thereto. Threaded bolt 117 extends through leg 116 and threadably engages threaded slot 34 of first-mentioned channel 24 to secure bracket 112 therein. The end tip of leg 116 is embraced by V-shaped channel-wall groove 50 to help hold bracket 112 within first-mentioned channel 24.

Referring to FIG. 5, two body members 10 are joined together at right angles by any desirable means, an example of which is illustrated in FIG. 8. FIG. 5 illustrates only two body members 10 joined together at right angles, but four of these body members may be joined together to form a rectangular frame. Additional channels 58 are disposed on the inner sides of the angle formed by the joining of body members 10 so that threaded slots 68 of additional channels 58 are positioned along the inner perimeter of the frame. Rectangular sheet member 118 has its lateral sides matingly fitted within threaded slots 68 of each of the body members 10. Thus it can be seen that by forming a frame around sheet member 118 with the lateral edges of sheet member 118 being embraced by threaded slots 68, sheet member 118 can be held in place within the frame.

FIG. 6 illustrates body member 10 with two different attachments thereon. An elongated rectangular sheet member 120 is slidably inserted within U-shaped channel-wall grooves 76, 78, of additional channel 58. Between sheet member 120 and channel floor 60 of additional channel 58 is an undulating spring element 122. Spring element 122 exerts pressure on sheet member 120 to hold it against sliding movement within channel-wall grooves 76, 78, but is yieldable downward to permit sheet member 120 to be removed. Within first-mentioned channel 24 is mounted a cambered sheet member 124 which has two of its opposite sides slidably received within V-shaped channel-wall grooves 48, 50. This arrangement is particularly desirable for use with display cases for exhibiting price and other indicia.

FIG. 7 illustrates a cross-shaped bracket 126 for securing two body members 10 together. Cross-shaped bracket 126 is comprised of two cross-plates 128, 130, which are rigidly secured at their inner section by welding or other desirable means. Bottom cross-plate 130 is slidably received within V-shaped channel-wall grooves 48, 50, and is slidable therein along the length of channel 24. Bolts 132 extend through apertures in bottom cross-plate 130 and are threadably engaged within threaded slot 34 of channel 24. As bolts 132 are loosened slightly cross-shaped bracket 126 is permitted to slide along channel 24, and as bolts 132 are tightened bracket 126 is held against movement within channel 24. Upper cross-plate 128 is received within channel 24 of the second body member 10 in a manner similar to that previously described for bottom cross-plate 130. Thus cross-shaped bracket 126 provides a means for securing two body members together at right angles at any desirable point along the lengths of the two respective body members.

FIGS. 9, 10, and 11 illustrate a modified form of the structural element of this invention wherein apertures are drilled in the body members for receiving bolts to secure the body members together. At a point slightly inward from the end of body member 10 is drilled a cross-aperture 134 which extends parallel to channel floor 60 of additional channel 58 and transversely to first-mentioned channel 24. At the end of body member 10 extending inwardly therefrom is an end-aperture 136 which forms a communication with cross-aperture 134. End-aperture 136 is large enough to receive the shank 137 of bolt 138 but is smaller than head 140 or nut 142 of bolt 138. Cross-aperture 134 however is large enough to receive head 140 and nut 142 of bolt 138. Thus a means is provided for securing a plurality of body members together in an infinite body of configurations. Any number of apertures the size of bolt shank 137 may be drilled through body member 10 at any desirable point to facilitate attachment at that point. FIGS. 9, 10, and 11 illustrate just a few of the infinite number of ways to secure body members 10 together by means of these apertures and bolts.

In view of the above, it will be seen that the several objects of the invention are achieved and other advantageous results attained.

As various changes could be made in the above constructions, it is intended that all matter contained in the above description or shown in the accompanying drawings shall be interpreted as illustrative.

What is claimed is:

1. A structural element comprising an elongated body member; a channel extending along a first side of said body member, said channel having in cross-section an open mouth and a channel floor between first and second lateral channel walls; a threaded slot extending along the length of said channel floor, said threaded slot being substantially U-shaped in cross-section and having threads running longitudinally along its slot walls; first and second U-shaped channel-wall grooves oppositely positioned in said first and second lateral channel walls respectively and extending longitudinally along the length thereof.

2. The structural element of claim 1 wherein a smooth-walled slot extends longitudinally along said channel floor adjacent to said threaded slot.

3. The structural element of claim 1 including an additional channel extending along a second longitudinal side of said body member, said additional channel member having in cross-section an open mouth and a channel floor between first and second channel walls, an additional threaded slot extending along said additional channel floor, said additional threaded slot being substantially U-shaped in cross-section and having threads running longitudinally along its slot walls; first and second additional channel-wall grooves oppositely positioned in said first and second lateral channel walls of said additional channel, respectively, said additional wall grooves being substantially V-shaped in cross-section, the open ends of said cross-sectional V-shapes facing one another.

4. The structural element of claim 3 wherein said body member is rectangular in cross-section and includes third and fourth lateral sides opposite said first and second lateral sides, respectively, said third side including a channel identical to said first-mentioned channel and said fourth side including a channel identical to said additional channel.

5. The structural element of claim 1 wherein a cross-aperture extends through said body member transverse to the longitudinal axis of said body member.

6. The structural element of claim 5 wherein an end-aperture extends inwardly from the end of said body member, said end-aperture being in communication with said cross-aperture.

7. A structural element comprising an elongated body member; a channel extending along a first side of said body member, said channel including in cross-section a channel floor and first and second lateral channel walls extending upwardly from said channel floor; the upper ends of said lateral channel walls being above said channel floor; a threaded slot in said channel floor extending longitudinally therealong, said threaded slot being substantially U-shaped in cross-section and having threads running longitudinally along its slot walls; and a smooth-walled slot extending along said channel floor adjacent one side of said threaded slot.

8. A structural element according to claim 7 wherein a second smooth-walled slot extends along said channel floor adjacent said threaded slot; said first mentioned smooth-walled slot and said second smooth-walled slot being on opposite sides of said threaded slot.

9. The structural element of claim 7 wherein first and second channel-wall grooves are oppositely positioned in said first and second lateral channel walls, respectively, and extend longitudinally along the length thereof.

10. The structural element of claim 7 wherein said first and second lateral channel walls each form a shoulder, said shoulder of said first lateral channel wall being substantially in the same plane as said shoulder of said second lateral channel wall; portions of said channel floor being in the same plane as said shoulders.

References Cited

UNITED STATES PATENTS

| | | | |
|---|---|---|---|
| 2,985,263 | 5/1961 | Maciunas | 52—720X |
| 3,023,859 | 3/1962 | Muessel | 52—720 |
| 3,126,986 | 3/1964 | Madl | 52—282X |
| 3,159,250 | 12/1964 | Wilson | 52—738X |
| 3,256,659 | 6/1966 | Dudoff | 52—243X |

PRICE C. FAW, JR., Primary Examiner

U.S. Cl. X.R.

52—242, 280, 282, 300, 656, 720, 729

UNITED STATES PATENT OFFICE
CERTIFICATE OF CORRECTION

Patent No. 3,566,561          Dated March 2, 1971

Inventor(s) Francis P. Tozer

It is certified that error appears in the above-identified patent and that said Letters Patent are hereby corrected as shown below:

Column 1, lines 3 and 4, "Francis P. Tozer, 1601 S. Hanley Road, St. Louis, Mo. 63144" should read -- Francis P. Tozer, Sunset Hills, Mo., assignor to Shure Manufacturing Corporation, St. Louis, Mo., a corporation of Missouri --. Column 2, line 55, "thread" should read -- threaded --.

Signed and sealed this 24th day of August 1971.

(SEAL)
Attest:

EDWARD M. FLETCHER, JR.
Attesting Officer

WILLIAM E. SCHUYLER, JR.
Commissioner of Patents